United States Patent
Buchner et al.

(10) Patent No.: US 8,228,202 B2
(45) Date of Patent: Jul. 24, 2012

(54) TRANSMITTING INFORMATION TO A USER'S BODY

(75) Inventors: Peter Buchner, Kirchheim/Teck (DE); Ulrich Clanget, Ingbert (DE); Jörg Treiner, Berlin (DE); Sophie Boucher, Paris (FR); Aline Dahlke, Paris (FR)

(73) Assignee: Sony Deutschland GmbH, Cologne (DE)

( * ) Notice: Subject to any disclaimer, the term of this patent is extended or adjusted under 35 U.S.C. 154(b) by 1846 days.

(21) Appl. No.: 10/966,817

(22) Filed: Oct. 15, 2004

(65) Prior Publication Data

US 2005/0132290 A1 Jun. 16, 2005

(30) Foreign Application Priority Data

Oct. 17, 2003 (EP) .................................. 03023681

(51) Int. Cl.
*G08B 23/00* (2006.01)
(52) U.S. Cl. ............. 340/573.1; 341/20; 414/6; 463/36
(58) Field of Classification Search ............... 340/573.1, 340/573.2, 573.3, 573.4, 573.5, 573.6; 600/38; 414/1, 2, 5; 341/20, 21; 463/36–38
See application file for complete search history.

(56) References Cited

U.S. PATENT DOCUMENTS

| | | | | |
|---|---|---|---|---|
| 4,958,632 | A * | 9/1990 | Duggan | 607/11 |
| 5,305,423 | A | 4/1994 | Clynes | |
| 5,984,880 | A * | 11/1999 | Lander et al. | 600/595 |
| 6,368,268 | B1 * | 4/2002 | Sandvick et al. | 600/38 |
| 6,601,140 | B1 * | 7/2003 | Okaue et al. | 711/115 |
| 6,695,770 | B1 * | 2/2004 | Choy et al. | 600/38 |
| 6,786,863 | B2 * | 9/2004 | Abbasi | 600/38 |
| 6,801,140 | B2 * | 10/2004 | Mantyjarvi et al. | 340/999 |
| 6,812,840 | B2 * | 11/2004 | Gehlot et al. | 340/572.1 |
| 6,832,178 | B1 * | 12/2004 | Fernandez et al. | 702/189 |
| 7,046,151 | B2 * | 5/2006 | Dundon | 340/573.1 |
| 7,282,028 | B2 * | 10/2007 | Kim et al. | 600/300 |
| 7,468,032 | B2 * | 12/2008 | Stahmann et al. | 600/301 |
| 7,593,783 | B2 * | 9/2009 | Fernandez | 700/132 |
| 2003/0016207 | A1 | 1/2003 | Tremblay et al. | |
| 2004/0133080 | A1 * | 7/2004 | Mazar et al. | 600/300 |
| 2005/0075116 | A1 * | 4/2005 | Laird et al. | 455/456.3 |

FOREIGN PATENT DOCUMENTS

| | | |
|---|---|---|
| EP | 0 875 821 A2 | 11/1998 |
| EP | 1 276 037 | 1/2003 |
| WO | WO 98/14860 | 4/1998 |
| WO | WO 99/48082 | 9/1999 |
| WO | WO 01/41636 A1 | 6/2001 |

* cited by examiner

*Primary Examiner* — George Bugg
*Assistant Examiner* — Edny Labbees
(74) *Attorney, Agent, or Firm* — Oblon, Spivak, McClelland, Maier & Neustadt, L.L.P.

(57) ABSTRACT

A method for transmitting information to a body includes providing a set of standardized codes. Each code of the standardized codes is associated with a predefined activation pattern for at least one actuator designed to transmit the information to the body using skin as an interface. A code or a combination of a plurality of codes is selected and transmitted to a wearable accessory having integrated therein the at least one actuator. The at least one actuator is outside a user's body. The at least one actuator is controlled according to the predefined activation pattern associated with the code or the combination of the plurality of codes transmitted. Features about emotional states or states of mind are extracted from biometric and/or environmental signals of biometric and/or environmental sensors. The features are mapped to stored meta information. The meta information is wirelessly transmitted to a receiver.

20 Claims, 9 Drawing Sheets

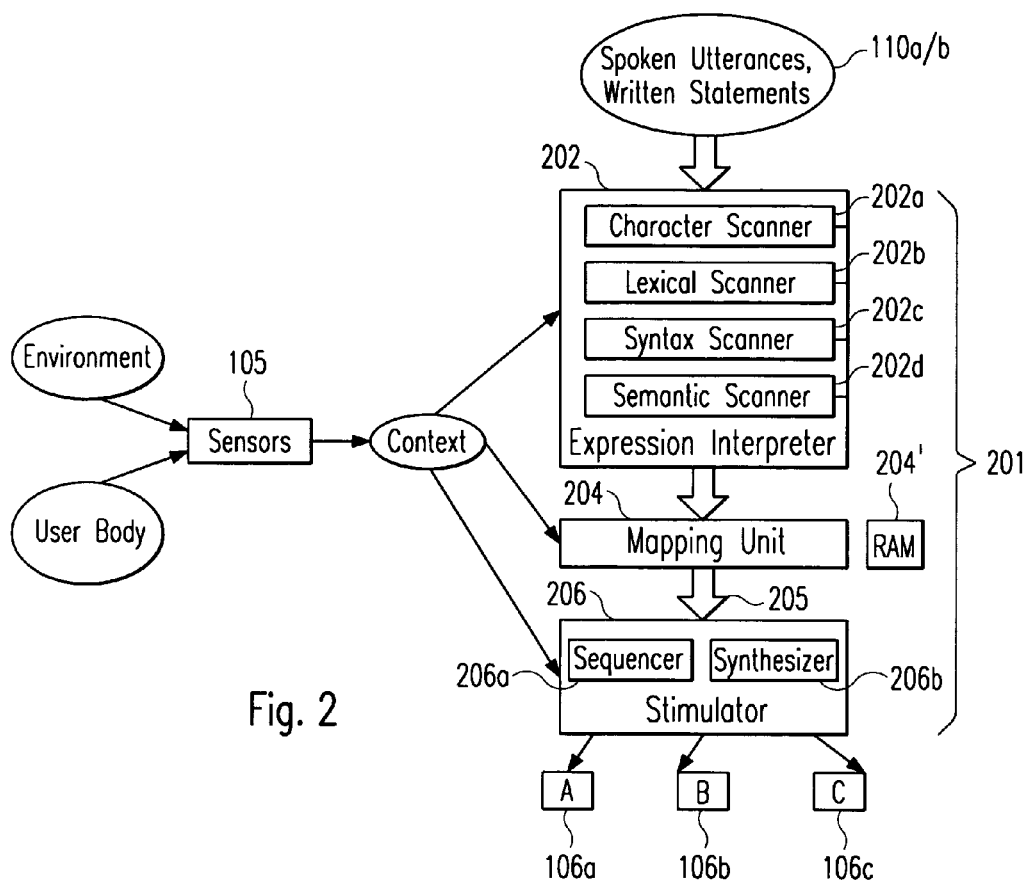
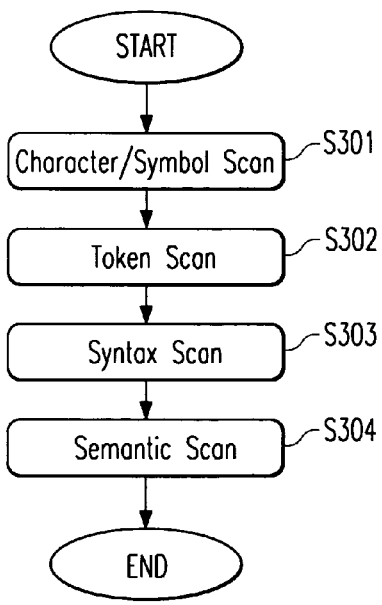
Fig. 3
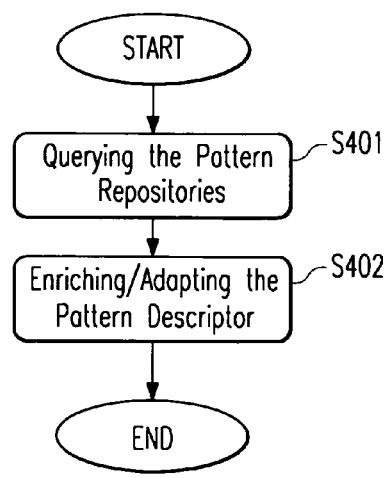
Fig. 4

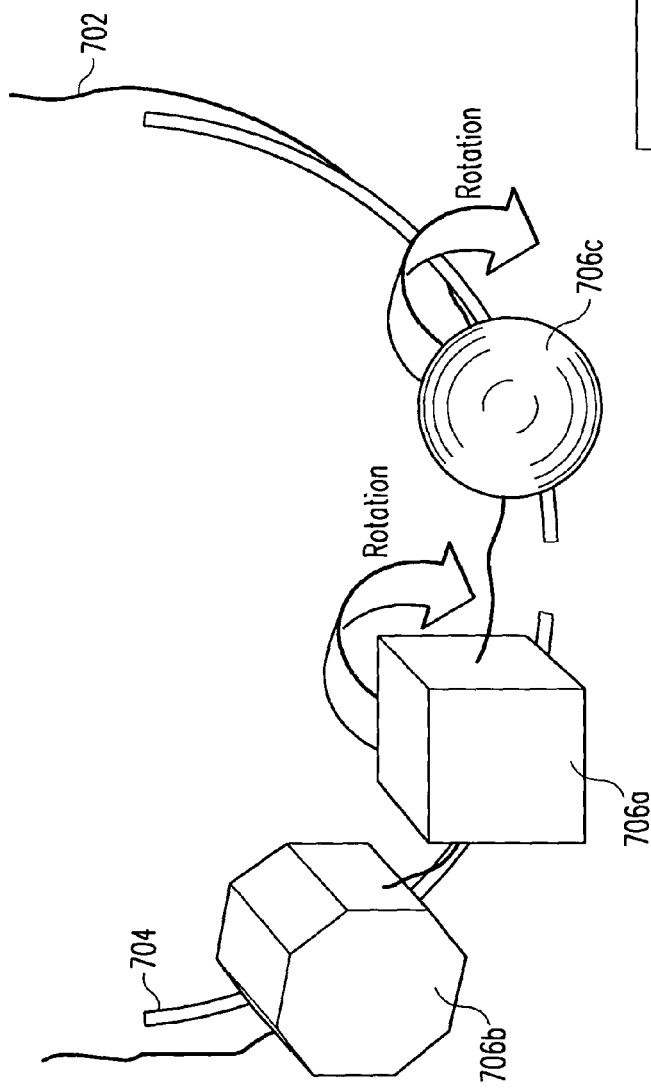
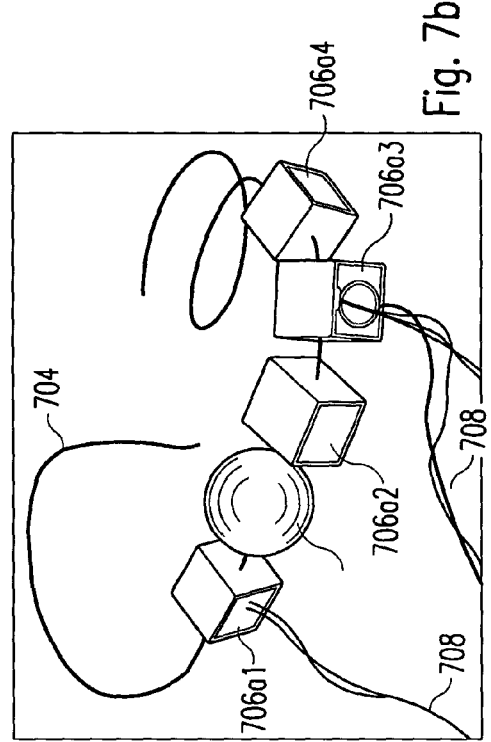

TRANSMITTING INFORMATION TO A USER'S BODY

FIELD AND BACKGROUND OF THE INVENTION

The present invention generally relates the transmission of information to a user's body using the skin as an interface.

BRIEF DESCRIPTION OF THE PRESENT STATE OF THE ART

WO 01/41636 A1 refers to a tactile communication system enabling remotely control of tactile output devices, e.g. motor actuators, which are used for a sensory/tactile stimulation of human muscles, limbs, and body joints by vibrations, warmth electromagnetic impulses, etc. The system enables e.g. parents to transmit touch feelings to their child by placing one hand onto a pressure-sensitive pad and sending control signals derived by evaluating these pressure signals via a computer network to a tactile output device being in physical contact with the child.

WO 98/14860 pertains to a method for transmitting the touch of a sensor array via a computer or computer network and a corresponding system for transmitting perceptible feelings, which comprises at least one computer, a sensor array for detecting touches from a person and providing sensor signals, an actuator array for generating physically perceptible pressure signals, and a control unit linking the sensor array and the actuator array to the computer.

EP 0 875 821 A2, a communication terminal device with a tactile feedback is described. The device comprises a pen-input tablet, a microphone, an acceleration sensor and a number of pressure sensors.

A computerized system including a touch-/pressure-sensitive transducer and a computer responsive thereto for producing a sentic cycle and recording touch expression is disclosed in U.S. Pat. No. 5,305,423. Thereby, different emotions are expressed and generated by applying appropriate finger pressure to specific actuators of said transducer.

PROBLEMS ENCOUNTERED WITH PRIOR-ART SOLUTIONS

Physical expressions of love and affection (a hug, a kiss, a caress, etc.) are only possible in face-to-face communication as they require close proximity of people. Conventional communication systems (e.g. email systems), which enable the expression of feelings with the aid of signs, are oblivious to affective expressions and not capable of transmitting this type of information. Of course, email users can describe emotions, sensations or states of a person's mind with the aid of written or spoken words, symbols (e.g. Internet or SMS emoticons such as ":-)", ":-|", or ":-("), sound or images, but they are not able to physically share these feelings with other email users.

OBJECT OF THE PRESENT INVENTION

In view of the explanations mentioned above, it is the object of the present invention to propose a technique for transmitting information to a user' body.

This object is achieved by means of the features of the independent claims. Advantageous features are defined in the subordinate claims.

SUMMARY OF THE INVENTION

According to one aspect of the present invention a method for transmitting information to a user's body is proposed, said method comprising the following steps:

providing a set of standardized codes, each code being associated with a predefined activation pattern for at least one actuator designed to transmit information to a user using the skin as an interface to the user, selecting and transmitting a code or a combination of a plurality of codes to a wearable accessory having integrated therein the at least one actuator, and controlling the at least actuator according to the activation pattern associated with the code transmitted.

The actuator can be designed to transmit tactile, virational, pressure, heat stimuli to the skin of a user.

A code can be selected based on a user's manual, visual or audio input or signals originating from biometric sensors.

According to another aspect of the present invention a computer program product is proposed supporting such a method when running on a computing device.

According to a still further aspect of the invention a wearable piece of garment or accessory comprises:

an array of actuators designed to transmit stimuli to a user using the skin of the users's body as an interface, and a controller being functionally connected to the array of actuators in order to activate them according to a defined operational pattern.

Finally, a system for transmitting physical expressions of affection comprises:

means for generating a coded signal out of a set of coded signals, each coded signal being associated with a predefined activation pattern for at least one actuator designed to transmit information to a user using the skin as an interface to the user, means for transmitting the at least one of the coded signals to a wearable accessory having integrated therein the at least one actuator, and means for controlling the at least acuator according to the activation pattern associated with the coded signal transmitted.

The system can comprise means for selecting a coded signal based on a user's manual, visual or audio input or signals originating from biometric or environmental sensors.

BRIEF DESCRIPTION OF THE DRAWINGS

Further advantages and conceivable applications of the present invention result from the subordinate claims as well as from the following description of one embodiment of the invention as depicted in the following drawings:

FIG. 2 is a block diagram of the interactions sensors used for monitoring physical, the processing unit according to the invention and actuators for stimulating the user by generating vibrational, heat, pressure and/or electric impulses, FIG. 3 is a flow chart of the phases of the Expression Interpreter, FIG. 4 is a flow chart of the phases of the Mapping Unit.

FIG. 7a is a schematic diagram of a vibro-tactile stimulation system having the form of a necklace with so-called "digital beads" that comprise a variety of actuators FIG. 7b is a photograph showing a necklace with five cuboidal beads and one spheroidal bead, used as casings for the actuators of the tactile stimulation system.

DETAILED DESCRIPTION OF THE PRESENT INVENTION

In the following embodiments of the present invention as depicted in FIGS. 1a to 6 shall be explained in detail.

Figure 1A:
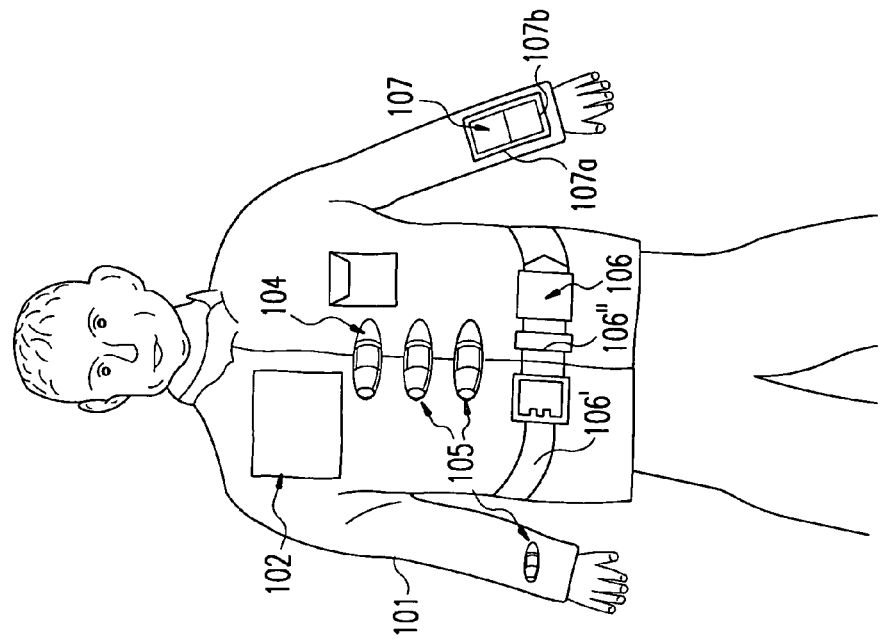
FIG. 1a shows a user wearing a piece of clothing which includes integrated electronic devices and actuators worn on or placed near the user's body.

FIG. 1a shows a user wearing a "smart" jacket 101, which smart jacket 101 has integrated therein at least one actuator 106 which is able to generate vibrational, heat, pressure or electric pulses to transmit information using the skin of the user as an interface. Note that the smart jacket 101 is just one example for a wearable computing device, preferentially integrated in a garment or accessory.

102 designates a liquid crystal display (LCD) which is incorporated in the upper right front part of the smart jacket 101 and which is e.g. useable to display emotional states of the user wearing the jacket 101 e.g. via emoticons or other standardized symbols and signs.

104 designates a smart bottom for bottoming up said jacket 101, which bottom can also be used for activating or deactivating a function allowing the wearer of the jacket 101 e.g. to listen to music recorded on an integrated microchip, displaying moving images on the liquid crystal display 102 and to control the actuator 106 (f.e. switching on/off the actuator 106).

105 designates biometric sensors (e.g. body temperature, blood pressure, respiration rate and/or pulse rate) for monitoring these biometric signals originating from the user of the jacket 101.

106' designates processing means for processing e.g. the biometric signals taken from the user of the jacket 101 and/or measured environmental parameters of the user. As will be explained later on, these processing means 106' are also able to map information (taken from the biometric signals, typed in via an integrated keyboard 107a, etc.) to the standardized vocabulary of a "feeling language".

Furtheron, these processing means 106' control the function of the at least one actuator 106 by being functionally connected thereto.

106" designates a battery pack which is integrated in the waste belt of the smart jacket 101 in order to provide an autonomous energy resource.

107 is a control display integrated into the left sleeve of the smart jacket 101, whereby 107a designates a manual input device (f.e. keyboard, touchscreen etc) for entering user and control information and 107b designated a "Jog dial" integrated into the left sleeve of the smart jacket 101.

Figure 1B:
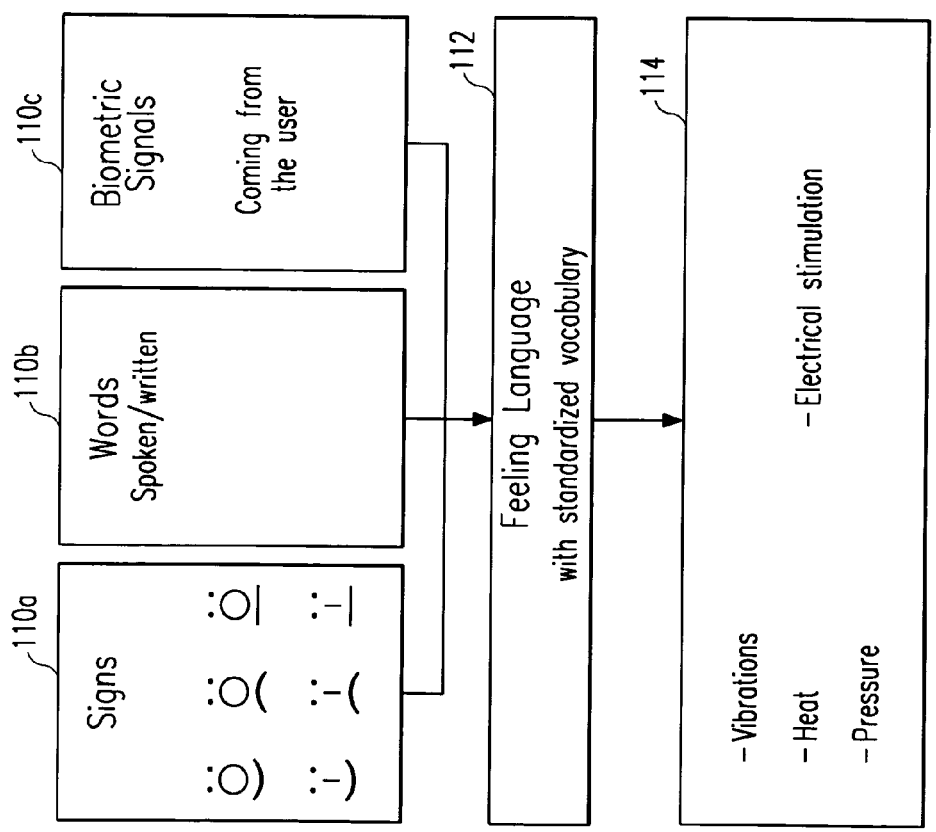
FIG. 1b is a block diagram showing the feature extraction and tactile stimulation procedure according to the present invention.

The hardware shown in FIG. 1a can be used to carry out a method as schematically shown in FIG. 1b. As shown in FIG. 1b different input signals, such as signs (emoticons) 110a, spoken or written words 10b (generally: audio, visual or manually entered information) and biometric signals 110c from a user are mapped (step 112) to a standardized vocabulary (codes) of a "feeling language". This feeling language is a protocol to transmit any input information 110a, 110b, 110c in a unified (standardized) way and to interpret this information on a receiver side via the operational control pattern of the actuators using the skin of the user as an interface (e.g. via vibrational, heat, pressure, or electrical stimulation).

FIG. 2 shows a block diagram for an implementation of the schematic procedure shown in FIG. 1b. Sensors 105 detect f.e. environmental signals or biometric signals from the user's body in order to detect a current environmental, physical or physiological context of the user and to transmit the context information to a transformation module 201, i.e. an expression interpreter 202, a mapping unit 204 and a stimulator unit 206.

The transformation module 201 comprises an expression interpreter 202, a mapping unit 204 as well as a stimulator unit 206 for controlling actuators 106a, 106b, 106c according to defined operational pattern.

The expression interpreter 202 of the transformation module 201 recognizes both the signals from the sensors 105 or other visual, audio or manual input such as spoken utterances or written statements 110a/110b and generates an output signal to the mapping unit 204. The expression interpreter 202 thereby comprises a character scanner 202a for recognizing characters, numbers, signals and signs of a entered written information e.g. typed in on the integrated keyboard 107 of the smart jacket 101.

Furthermore, a lexical scanner 202b is provided for automatically recognizing feeling language tokens belonging to a "feeling language vocabulary".

Furtheron, the expression interpreter can comprise a phonetic scanner for automatically recognizing the phonemes (vaults, diphthongs, semi-vaults and consonants) in a spoken utterance 110a of the user.

A syntax scanner 202c analyses the grammatical structure of a recognized "feeling language statement", while a semantic scanner 202d interprets feelings expressed by the user by performing a semantic analysis of recognized and synthetically analyzed feeling language statements.

The output signal of the expression interpreter 202 is supplied with the mapping 204 which is operationally connected to a memory (e.g. a ramp) 204'.

In the memory 204' the vocabulary, i.e. standardized codes is stored. Each standardized code is associated with a predefined activation pattern for at least one actuator designed to transmit information to a user using the skin as an interface to the user. The mapping unit 204 maps the output signals of expression interpreter 202 to one or a combination of the codes stored in the memory 204' and transmits 205 with standardized codes or the combination thereof to a stimulator unit 206 which can e.g. be the array of actuators in the smart jacket 101 according to FIG. 1*a*. The stimulating unit 206 comprises a sequencer 206*a* for simultaneously rendering multi-channel patterns controlling different actuators 106*a*-106*d* on a single base. A synthesizer unit 206*b* in the tactile stimulator unit 206 provides a number of different basic wave shapes and possibilities for adapting those wave shapes to achieve different operational patterns.

FIG. 3 shows a flow chart of the process carried out by the expression interpreter 202. In the step S301 a character scan procedure for automatically recognizing characters, numbers and/or symbols e.g. typed in the integrated keyboard 107*a* of the smart jacket 101 is carried out.

In a step S302 a lexical scan procedure is carried out for automatically recognizing feeling language tokens belonging to a feeling language vocabulary.

In a step S303 a syntax scan procedure for analyzing the grammatical structure of a "feeling language statement" is carried out. Finally, in a step S304 a semantic scan procedure for interpreting the output signal of the syntax scan step S303 is carried out by performing a semantic analysis of the recognized and synthetically analyzed feeling language statements.

FIG. 4 shows a flow chart of the steps carried out by the mapping unit 204.

Figure 6:
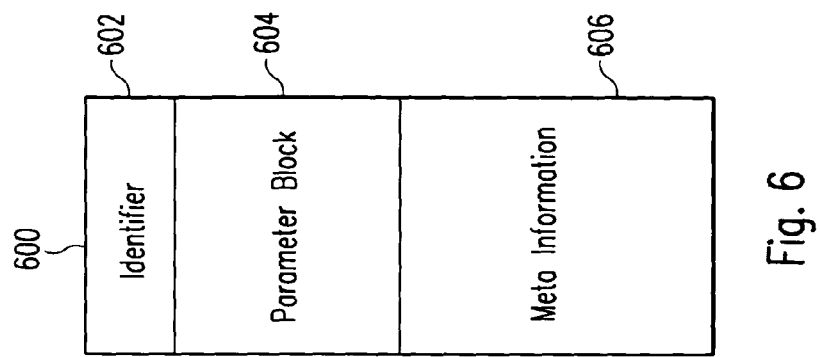
FIG. 6 shows the format structure of a typical pattern descriptor in the Unified Pattern Format (UPF).

In a step S401 the memory 104' which serves as a repository for meta information (codes) representing feelings, technical sensations perceived and/or physical affection is searched. In a step S402 the UPF pattern descriptors 600 (s. FIG. 6 lateron) is enriched or updated with additional information derived from available context information provided by a number of different biometric (105) and/or environmental sensors (105') which can e.g. be integrated in the clothing 101 worn by a person.

Figure 5:
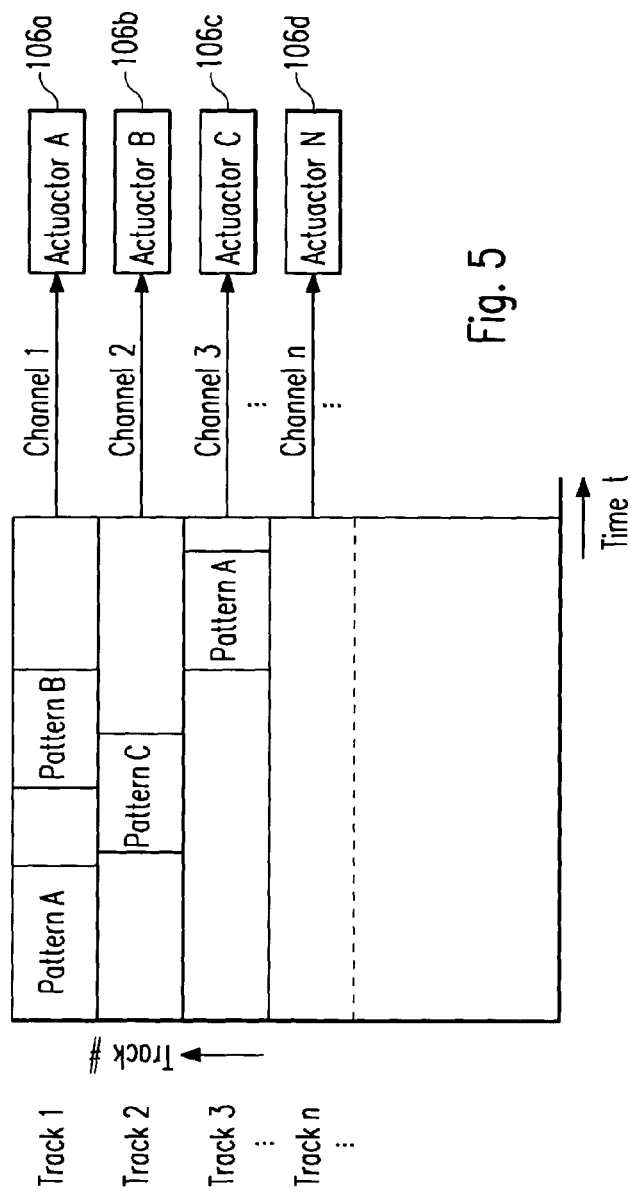
FIG. 5 is a flow chart of the phases of the Tactile Stimulator.

FIG. 5 is a flow chart showing the processing bases carried out in the tactile stimulator unit 206. The different tracks respectively carrying operational patterns for the actuators A, B, C, . . . N are multiplexed over channels 1 . . . n to the actuators by the sequencer 206*a* of the technical stimulator 206.

FIG. 6 finally shows the format structure of an example for a pattern descriptor in a unified pattern format (UPF) wherein such a descriptor represents one example for a standardized code. Thereby 602 designates the head of the pattern descriptor 600 containing the descriptor identifier. 604 designates the parameter block of the pattern descriptor 600 containing a number of a required optional parameters needed for a parameterization of the respective pattern (amplitude, frequency, etc.). 606 designates the meta information contained in the pattern descriptor 600 needed for the selection of an appropriate pattern by the mapping unit 204.

According to the invention a smart piece of clothing or wearable accessory includes at least one integrated electronic devices. Tactile sensations, emotional states and/or states of mind of a person wearing this piece of clothing (in contrast to conventional communication media such as written text messages, emoticons, voice and images) can be detected and analyzed in order to stimulate another person depending on said feelings and/or the respectively perceived sensations by combining vibrational, heat, pressure and/or electric impulses generated by actuators worn on and/or placed near said person's body. Since the proposed system supports the use of the tactile communication channel on the sender and receiver side, it enables users to "touch" each other despite being at distinct locations and combines the benefits of traditional long-distance communication (which includes writing, speaking, sending pictures, signs and symbols, etc.) and traditional communication systems (email, SMS, MMS, EMS, etc.) with a new method for both sending and receiving emotional information. The invention thereby describes the syntax of a "feeling language", uses fixed or freely defined feeling messages and translates written emoticons (e.g. ":-)") or colloquial spoken utterances (e.g. "Whaoou!!") into understandable verbal phrases reflecting emotions of a person (e.g. "It's amazing! I feel good!"). Signals reflecting said information are sent to one or several recipients or posted on web sites, WAP or I-mode sites.

According to one embodiment of the invention, a single- or multi-location vibrational force is generated in a piece of clothing or any other accessory that can possibly be in contact with another piece of clothing (e.g. belts, buttons, tags, brooches, and strings) after having evaluated the wearer's emotional information, state of mind and/or tactile sensations. Also conceivable are accessories such as watches, wrist bracelets, arm bracelets, rings, etc. —so-called digital jewelry. The obtained force pattern may vary in length of time, in the strength of the signal or in frequency, accompanied by heat, pressure and/or electric impulses.

Reception of the aforementioned emotional and tactile information transmitted from a first user wearing a first wearable computing device to a second user wearing a second wearable computing device is enabled by vibration, heat, pressure and/or electric actuators which are integrated within a piece of clothing worn by said second user. Furthermore, body-contactless actuators in the form of small air nozzles directing an air flow to the skin of the person wearing this type of clothing can be provided. The arrangement of all these actuators within a piece of clothing gives said second user the possibility of being close to those parts of the skin of said first user which are sensitive to these types of perceptions.

It should be noted that the invention is also applicable to any device worn close to the body, carried in a pocket close to the body or in contact to the body while being used (e.g. mobile phones).

According to the invention, different ways of "entering" tactile and emotional information are conceivable. Said information can e.g. be entered via "direct input", which means that each sensation is directly coded with letters and signs on a standard keyboard. For example, <vib r 1 h> means a vibration of short duration with high frequency at right location. More examples are given below. Moreover, a keypad having keys for the most frequently occurring feelings can be used for entering this information. A standard keyboard can also be used to send words or emoticons of a new type of communication language. Besides, biometric signals measured by the first user can be evaluated and transmitted to said second user. This implies that both users (the sender and the recipient) wear a smart piece of clothing equipped with a wearable computing device. In this case, the sender is equipped with a number of biometric sensors (body temperature, blood volume pressure, respiration rate and/or pulse rate sensors, etc.) which are used for monitoring a number of biometric signals indicating the physiological, physical and/or psychological condition, tactile sensations perceived and/or physical expressions of affection reflecting feelings, impressions, emotional states and states of mind of the sender. Emotions can also be described with text on a web, WAP or I-mode page. A hyperlink on this text triggers sensations if a user is equipped with a piece of clothing as described above. The sensations can also be triggered when the user is reading, but this may imply an eye-tracking system since different readers have different reading speeds. In the future, gestures can also be a possible input. For example, a hand gesture initiating a caress can be detected and translated into actuator impulses. Moreover, a voice recognition system can be used to translate spoken utterances of a user wearing said piece of clothing (e.g. "Whaoou!!") into understandable verbal phrases reflecting his/her feelings and emotions (e.g. "This is exciting!"). Finally, tactile sensations can be triggered as soon as they are received or upon acknowledgment of the recipient only (e.g. by clicking on an attachment or by authorization).

If a tactile communication channel (sensor input and actuator output) is used on the sender as well as on the receiver side, information reflecting emotional states of a first user (the sender) wearing a piece of clothing equipped with sensing means for measuring e.g. biometric signals of the first user and actuating means for generating pressure, vibrational and/or electric impulses based on perceived sensations of said first user can directly be transmitted to a second user (the receiver) wearing such a piece of clothing by mapping a set of sensor values to an actuator pattern which generates feelings that are equal or at least similar to the sender's feelings.

A typical Internet or SMS emoticon such as e.g. ":-)" is translated into a short impulse or sequence of impulses at different force actuators. A typical emotional expression such as "I like you" is e.g. represented as "a longer, low-frequency force pressure with maximum heat and a tender pressure" at the center position of the actuators:

| Pattern | Meaning |
|---------|---------|
| <vib r 1 h> | vibration at right location/short/high frequency |
| <vib m 5 l> | vibration at middle location/long/low frequency |
| <heat r 80> | at right location 80% heat dispersion |

The translation of the emoticon ":-)" could also be represented as follows:

| Pattern | Meaning |
|---------|---------|
| <vib r 1 h m 1 h l 1 h> | vibration at right location/short/high frequency AND at middle location/short/high frequency AND at left location/short/high frequency |
| <vib r 1 h m 1 h l 1 h> | vibration at right location/short/high frequency AND at middle location/short/high frequency AND at left location/short/high frequency |
| <heat m 30-60 2> | increase of heat from 30% to 60% within 2 seconds |

In case both users (the sender and the receiver) are equipped with mobile phones capable of generating vibration alerts, the emoticon ":-)" in combination with a vibrational message is generated as an SMS (e.g. ":-) & <vib>"), which results in an SMS message display plus i.e. three short vibrations of the vibration alarm of the mobile phone.

A further embodiment of the present invention pertains to a new way of identifying people who are interested in meeting other people having a similar area of interest. Thereby, identification is based on a personal profile which can be downloaded into a processing unit of a mobile device, wearable device or electronic clothing equipped with an integrated radio transceiver and a vibrational force generator. As soon as two of these RF transceivers come into the range of joint operation, the personal profiles of their owners are compared and if interests are matching, a vibration alert indicates a person that another person with same or similar interests is close. The closer the distance, the stronger the activity of the vibrational force actuator. If those people are in visible range (especially if they are part of a crowd of people), they can recognize themselves via visual signals displayed on a display placed on the front and/or back of the top of a person's clothes. These signals can have specific characteristics such as color, brightness and contrast, which can vary by time. Recognition is possible as the visual signals are synchronized with the pattern mentioned above. For example, a T-shirt could flash with the rhythm of the patterns. If the visual communication channel is used, said patterns have to be locally unique.

In the following advantageous arrangements of actuators and their control by a user will be explained in detail.

As shown in FIG. 7a, 7b, one or a series of the same or different type of actuators $106a$-$p$ which are embedded in casings $706a1$-$a4$ that can be located on a user's body or very close to the body to transmit tactile messages. The actuators, f.e their intensity can be controlled in several ways, e.g. by rotating the casings. These casings are wearable and can detachably be mounted to achieve "plug-and-play" usage.

According to a first embodiment of the invention, a number of different actuator elements $106a$-$p$ generating vibro-tactile sensations are integrated into a piece of jewelry such as e.g. a necklace 704, a bracelet, rings with a single or variable number of beads, gemstones, etc. These actuator elements are embedded in detachable casings which are pivotable about their suspension axes. Said actuators $106a$-$p$ generate a tactile sensation which becomes the stronger the closer the actuators $106a$-$p$ are placed to the clavicle of a person wearing said necklace. Thereby, said gemstones can have any shape. Each of said beads, gemstones, etc. or at least some of them includes at least one integrated actuator element $106a$-$p$. A spherical bead can have e.g. four actuators all around its inside surface. A cuboidal gemstone can have four actuators, one on each side that can be turned towards the skin of a user wearing said piece of jewelry.

Thereby, a wireless module is attached to the waist of the user or integrated into his/her clothes, bags, mobile phones, etc. The messages to be transformed into feelable sensations are wirelessly transmitted to the necklace, bracelet closure or ring. The closure has also a wireless system to receive the data. The closure directs the data to the actuators $106a$-$p$ via the necklace 704, bracelet thread or via a wireless transmission channel in case the beads also comprise wireless modules. After having received such a message the actuators $106a$-$p$ get into action to generate a vibro-tactile sensation associated with said message. The intensity of the message can be modulated by the system on the sender side (during input) or on the receiver side (e.g. by means of mode selection —dynamic mode, soft mode, etc.) but also real time by the recipient of the message. This is achieved by a rotation of the beads about at least one axis to modulate the sensations from strong to very attenuated. One bead thereby serves to switch the system on (closed circuit) and off (open circuit), respectively. By rotating each bead, it is also possible to switch at least one of the embedded actuators $106a$-$p$ on and off.

In the following, for the sake of clarity, a cuboidal gemstone 706a comprising a single or a variety of actuator elements $106a$-$p$ shall be used as an example to further describe the invention.

Figure 8:
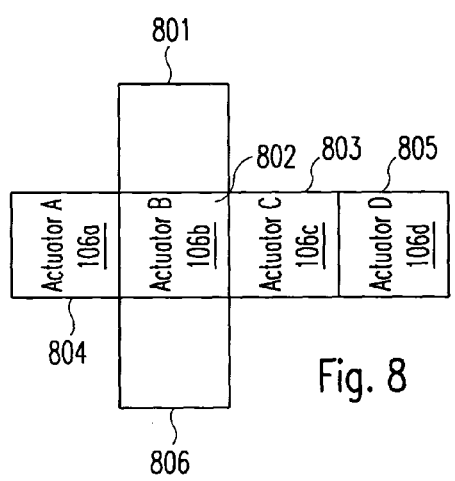
FIG. 8 is a diagram showing the net of a cuboidal casing which is used as a digital bead of a necklace that accommodates several actuators for generating tactile stimuli.
Figure 9A:
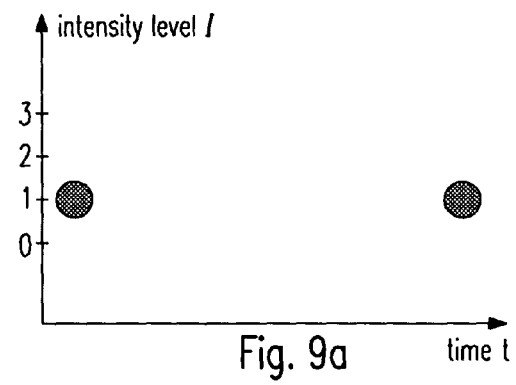
FIG. 9a shows the intensity levels of two sequential stimulation pulses.
Figure 9B:
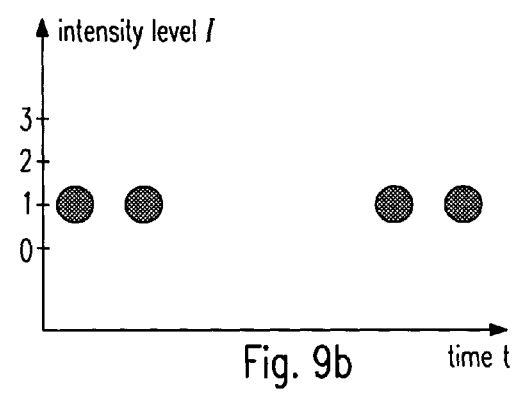
FIG. 9b shows the intensity levels of four sequential stimulation pulses.
Figure 9C:
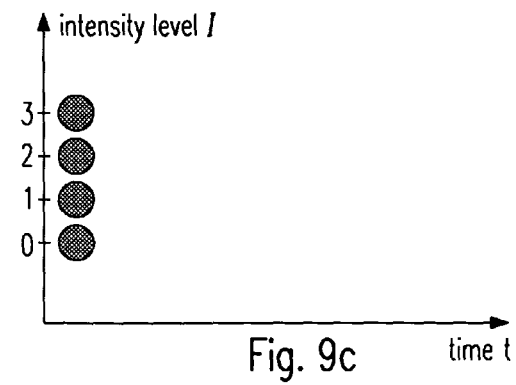
FIG. 9c shows the intensity levels of four synchronous stimulation pulses.
Figure 9D:
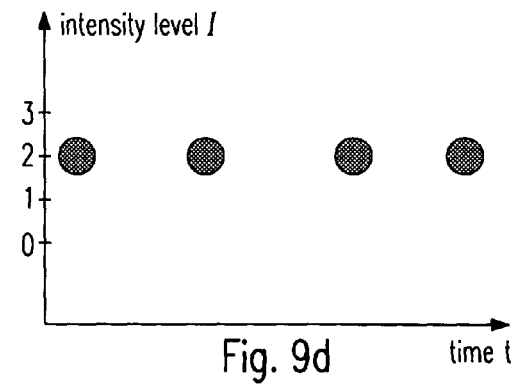
FIG. 9d shows the intensity levels of four sequential stimulation pulses.
Figure 10A:
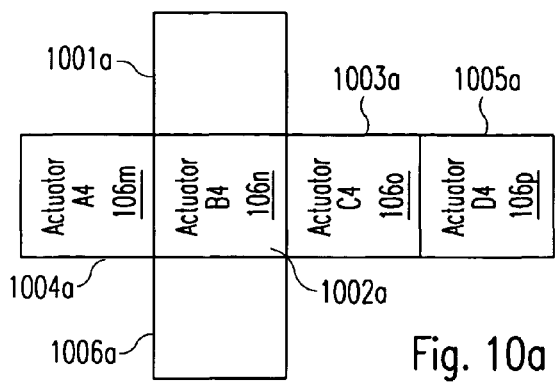
FIGS. 10a-d show the nets of four cuboidal actuator casings being pivotable about their suspension axes.
Figure 10B:
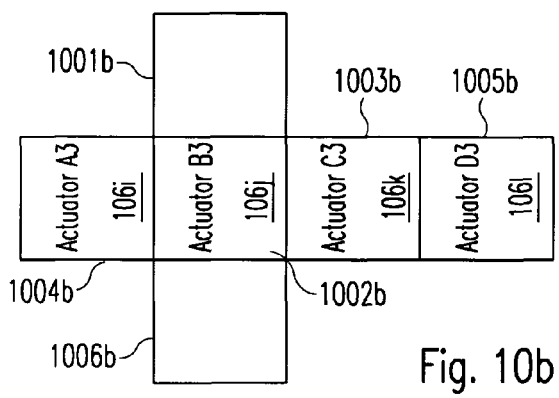
Figure 10C:
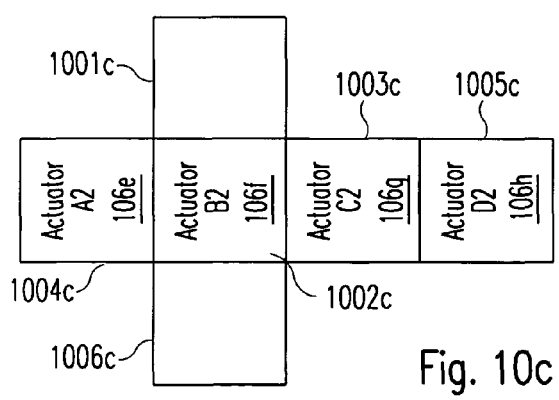
Figure 10D:
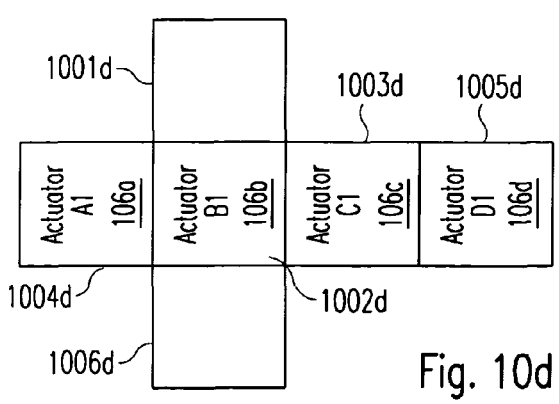

FIG. 8 shows the net of a cuboidal casing 806, used as a digital bead of a necklace 704 that accommodates a variety of actuators $106a$-$p$ for generating tactile stimuli, wherein said casing being pivotable about its suspension axis. In case actuator $106a$ (A), that is attached to side 804 of the cuboidal casing 806, is e.g. a vibro-motor, then the vibrations are felt the strongest if side 803 is in physical contact with the clavicle 702 of a person wearing said necklace 704. In case the opposite side of the cuboidal casing 706a—side 804—is in physical contact with said person's clavicle 702, the vibrations are a bit attenuated. If anyone of the sides 702 or 705 touches the clavicle 702, then said vibrations are much softer. This is one way to control the intensity (in addition to other methods such as intensity control by the electrical setup and control means) and/or switching on/off an actuator.

This gives the user the possibility to attenuate the vibrations according to his/her preferences. In some cases a user wants to feel the vibro-tactile sensations in a strong way, and in other cases in a soft way according to the tactile sensitiveness of his/her skin. Some vibrations may be perceived as aggressive to some users. The user thus has a possibility to tune parameters of the vibro-tactile signal, e.g. its frequency, duration and intensity, for his/her personal comfort.

Figure 11:
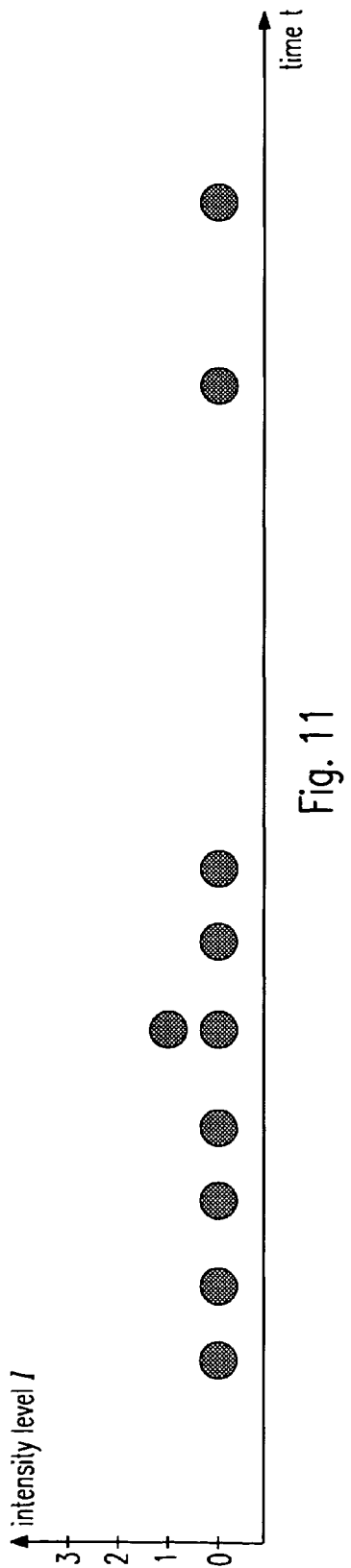
FIG. 11 shows the intensity levels of a variety of sequential or synchronous stimulation pulses.
Figure 12C:
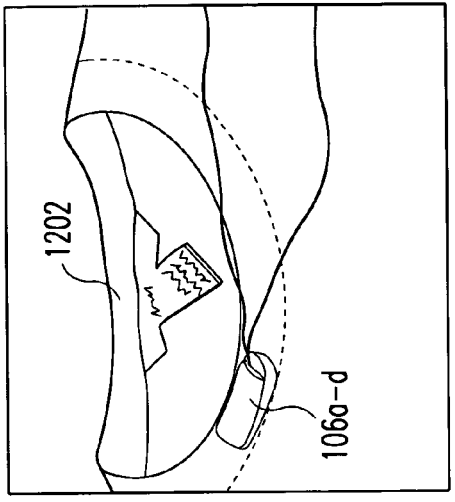
FIGS. 12a-d show different views of a T-shirt with at least one embedded actuator element.
Figure 12B:
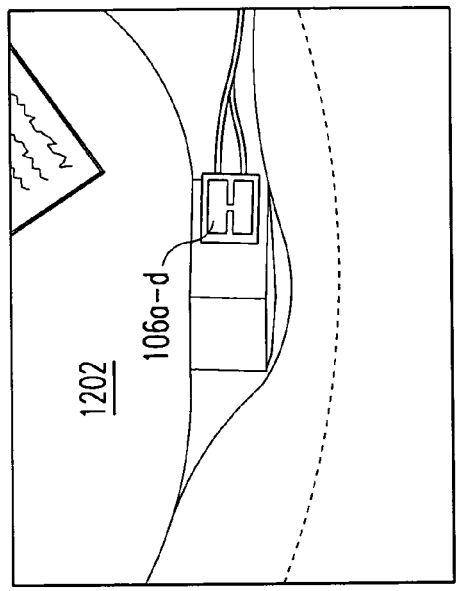
Figure 12A:
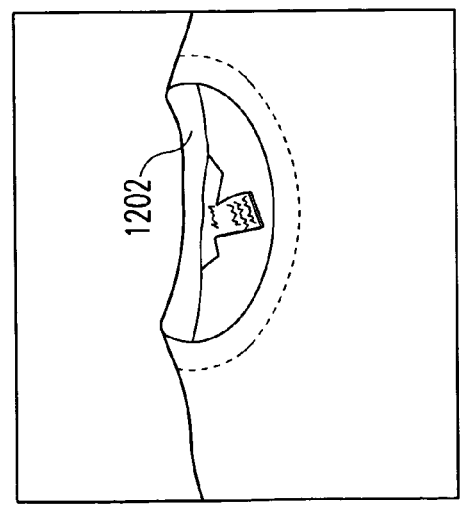
Figure 12D:
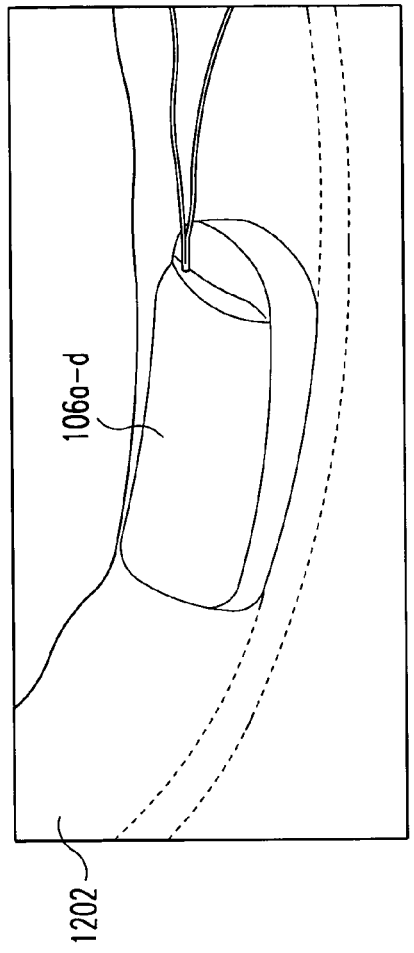

FIGS. 9a-d and 11 show the intensity levels of different sequential or synchronous stimulation patterns which are used for controlling the actuators 106a-p embedded in a single bead 706a (cf. FIGS. 9a-d) or several beads 706a1-a4 of said necklace 704 (cf. FIG. 11).

The nets of the cuboidal beads are depicted in FIGS. 10a-d. The user has the possibility to choose between four different intensity levels ('0', '1', '2', or '3'), wherein '0' denotes the weakest and '3' the strongest intensity level.

Inside one bead the actuators 106a-p, 106e-h, 106i-l, or 106m-p, respectively, can be of the same type (e.g. vibromotors) or of different types (e.g. vibro-motors, audio speakers, piezo benders, heating elements, peltier elements, micro fans and/or electrostatic discharge modules which are used for generating heat, coolness, pressure, acoustic signals, vibrational and/or electric pulses, respectively). Said actuators can individually be activated, in a sequence, or simultaneously. The beads 706a1-a4 have to exert an optimal force to the clavicle 702 of a user wearing said necklace 704 such that vibro-tactile sensations (and thus vibro-tactile messages) can easily be understood by the recipient of the message. Thereby, said optimal force can be obtained by choosing an optimal weight factor for each bead, which is derived as a function of the casing shape, user size, and actuator type.

Since the vibrations or other tactile stimuli should be feelable together or one at a time on one or several spots of a user's body, each bead 706a1-a4 has to be isolated from the necklace thread and also from the other beads. (Otherwise, the vibrations, for example, can be felt along the clavicle 702 and even around the neck. If vibrations can be felt along the necklace 704, the recipient can not understand the vibrotactile message.) This means that each bead 706a1-a4 which comprises at least one actuator element 106a-p has to be isolated from other beads that do not comprise any actuator elements. Isolation materials can be any material known today to dampen vibrations and reduce heat transfer from one medium to another. In general, the material of the beads should be chosen such that vibrations or other tactile stimuli are perceived in an optimal way. This e.g. includes polymers, metals, wood, special alloys or composite materials.

According to another aspect of the present invention, the casings of the actuator elements 106a-p are designed in such a way that their shapes are optimized for each actuator. For example, a cuboidal casing would have to be optimized e.g. for vibro-motors and/or micro fan. The micro fan e.g. requires that the air can circulate through the casing to allow the fan to produce cool air. Therefore, some openings can be provided.

Openings are also necessary for peltier elements and to allow the cooling of the micro motors. Other actuator elements can be used without housings.

A further embodiment of the invention pertains to a piece of clothing, e.g. a T-shirt, which comprises at least one embedded actuator element 106a whose casing is integrated into the collar or wrist cuffs of said T-shirt (cf. FIGS. 12a-d). Thereby, said actuator element 106 generates a tactile sensation that becomes the stronger the closer the respective actuator 106a is placed to the clavicle 702 of a person wearing said piece of clothing. To vary the intensity of the tactile stimuli, the casings 706a1-a4 of said actuator elements 106a-p are detachably mounted and can be pivoted about their suspension axes.

Figure 13A:
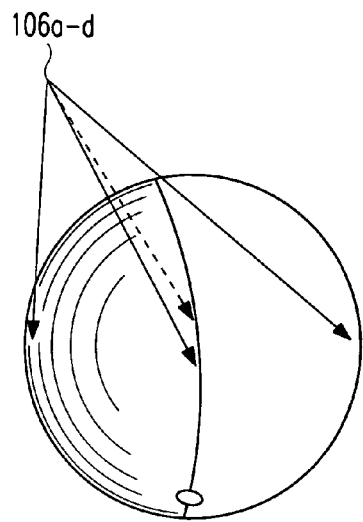
FIG. 13a shows a piece of jewelry having integrated actuator elements.
Figure 13B:
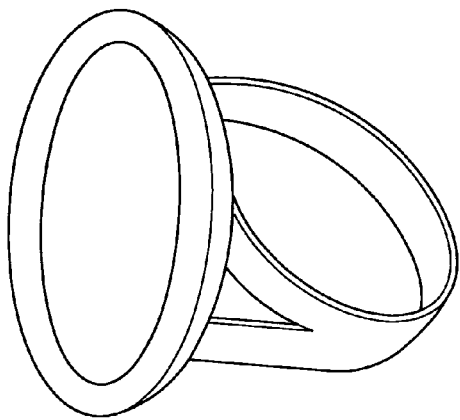
FIG. 13b shows a finger ring on which e.g. a gemstone or any piece of jewelry comprising integrated actuator elements can detachably be mounted.
Figure 13C:
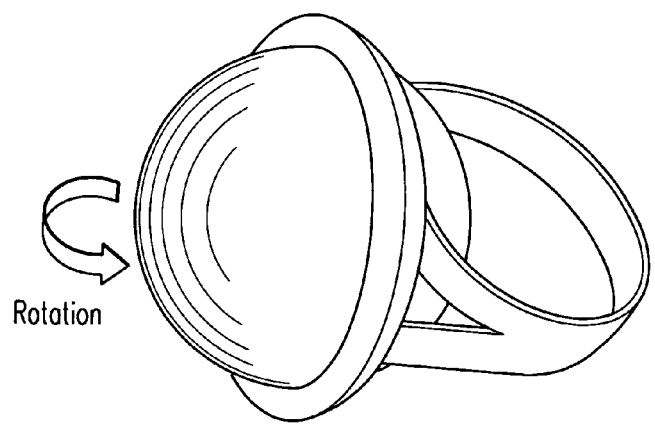
FIG. 13c shows the aforementioned gemstone detachably mounted on said finger ring.

According to a further aspect of the invention as depicted in FIGS. 13a-c, a single gemstone (or bead) 1300a can be mounted on a finger ring 1300b or an earring. If the user wears two ear rings, he/she has a two-actuator array. Using finger rings, the user can have up to ten actuators. Thereby, said gemstones can be pivoted about at least one axis.

Wearable accessories that comprise embedded actuator elements 106a-p as described above can also be worn on the arms (e.g. arm bands integrated into a piece of clothing) and/or in the pockets of a piece of clothing. Actuator casings 706a1-a4 with embedded actuator elements 106a-p can be located anywhere on a piece of clothing, e.g. in the form of buttons or as decorative stones (button design). The buttons are detachably mounted and can be pivoted about their suspension axes.

Figure 14:
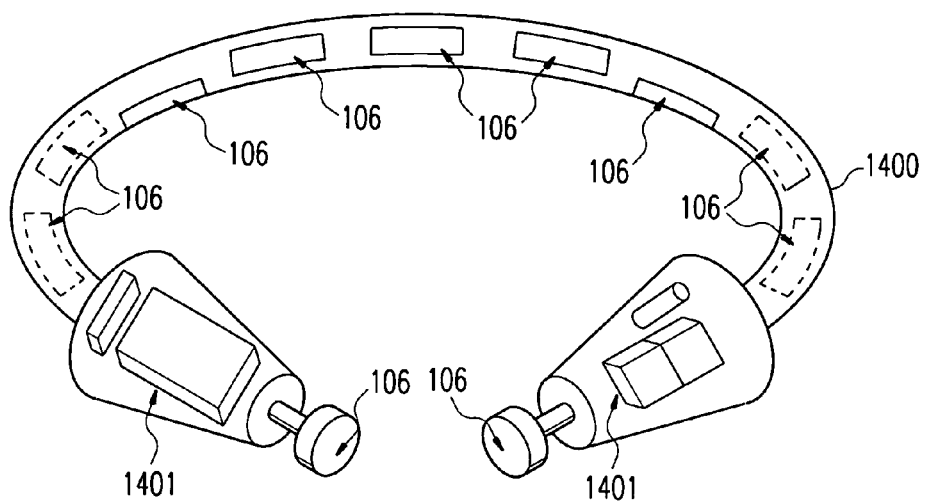
FIG. 14 shows an embodiment of the present invention, in which the actuators and a control device are integrated in a necklace type accessory.

As shown in FIG. 14, the invention can also be implemented via a necklace type accessory in which the actuators 106 as well as the control unit 1401 can be integrated. Note that it is preferred to house the necessary micro controllers, wireless modules and batteries at the extremities of the open necklace 1400, while the at least one actuator 106 is housed in the port of the necklace 1400 which rests on the side and the rear side of the neck of a user.

Figure 15:
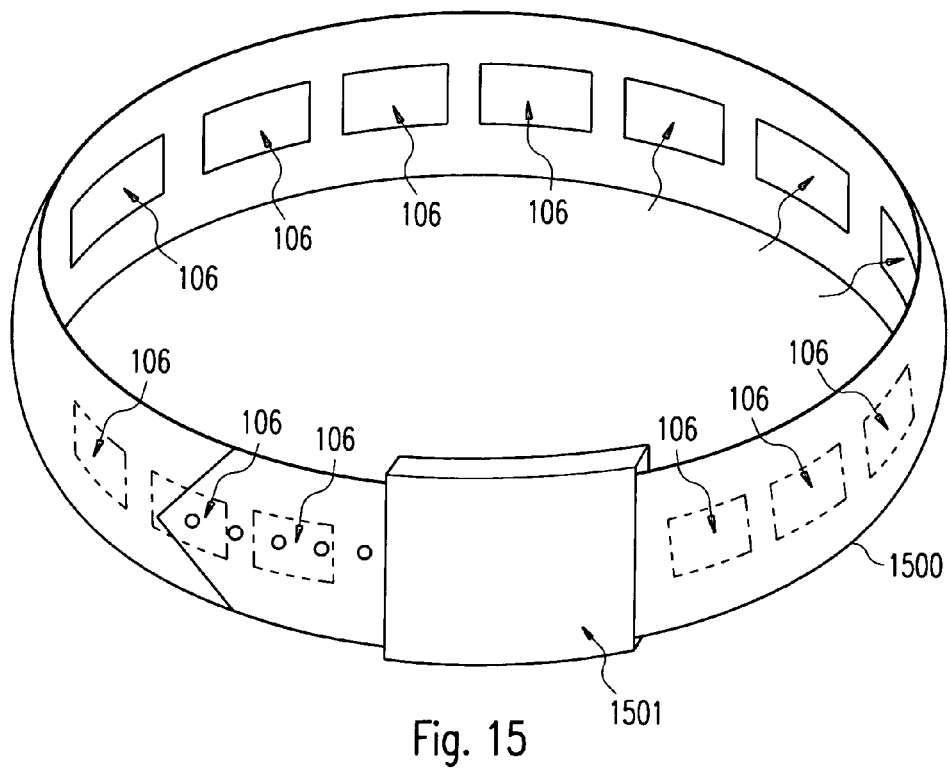
FIG. 15 shows a further embodiment in which the actuators and the control device are integrated in a built type accessory device.

In the embodiment of FIG. 15 the actuators 106 as well as the electronics necessary to control the actuators is integrated in a belt type accessory device 1500. Note that here it is preferred to house the control electronics RF interface, batteries etc. in the buckle portion 1501 of the belt 1500.

The invention claimed is:

1. A piece of clothing or wearable accessory having a stimulation system and a computing device, said device being connected to a controlling device, the piece of clothing or wearable accessory comprising:
    biometric and/or environmental sensors, the biometric and/or environmental sensors being integrated in the piece of clothing or wearable accessory;
    processing means including detecting means for detecting emotional states or states of mind from biometric or environmental signals;
    transmitting means for wirelessly transmitting meta information relating to the emotional states or states of mind to a receiver;
    receiving means for receiving meta information from another piece of clothing or wearable accessory;
    actuating means for generating stimuli to skin; and
    means for controlling the actuating means based on said meta information received, the means for controlling being connected with the receiving means and the actuating means.

2. The piece of clothing or wearable accessory according to claim 1, wherein said biometric sensors are sensors for measuring a body temperature, a skin conductivity, a blood volume pressure, a respiration rate, and/or a pulse rate.

3. The piece of clothing or wearable accessory according to claim 1, wherein said environmental sensors are sensors for measuring parameters indicating climatic and/or meteorological conditions given by a temperature, an atmospheric pressure, a relative humidity and/or a wind speed.

4. The piece of clothing or wearable accessory according to claim 1, further comprising:
a haptic interface including different sensing means for detecting tactile input information.

5. The piece of clothing or wearable accessory according to claim 1, wherein the processing means extracts features about emotional states or states of mind from entered audio, visual or manual information.

6. The piece of clothing or wearable accessory according to claim 5, wherein said actuating means includes vibro-motors, audio speakers, piezo benders, heating elements, peltier elements, micro fans and/or electrostatic discharge modules for generating heat, a coolness, a pressure, acoustic signals, and vibrational and/or electric pulses.

7. The piece of clothing or wearable accessory according to claim 1, further comprising:
at least one detachable casing that accommodates said actuating means, said casing being pivotable about at least one axis, and designed for changing operational parameters of said stimuli when being rotated about said at least one axis.

8. The piece of clothing or wearable accessory according to claim 7, wherein said operational parameters include an intensity, a duration and/or a frequency of said stimuli.

9. The piece of clothing or wearable accessory according to claim 1, wherein the actuating means are integrated in the piece of clothing or wearable accessory.

10. The piece of clothing or wearable accessory according to claim 1, wherein the biometric and/or environmental sensors are worn outside a user's body.

11. The piece of clothing or wearable accessory according to claim 1, wherein the detecting means comprises an extracting unit for extracting features from said biometric and/or environmental signals, and a mapping unit connected to a memory, the mapping unit being configured to map the extracted features to meta information stored in the memory.

12. A method for transmitting information to a body, said method comprising:
providing a set of standardized codes, each code of said standardized codes being associated with a predefined activation pattern for at least one actuator designed to transmit the information to the body using skin as an interface;
selecting and transmitting a code or a combination of a plurality of codes to a wearable accessory having integrated therein the at least one actuator, the at least one actuator being outside a user's body;
controlling the at least one actuator according to the predefined activation pattern associated with the code or the combination of the plurality of codes transmitted;
extracting features about emotional states or states of mind from biometric and/or environmental signals of biometric and/or environmental sensors, and mapping the features to stored meta information; and
wirelessly transmitting said meta information to a receiver.

13. The method according to claim 12, wherein the at least one actuator is designed to transmit tactile, vibrational, pressure and heat stimuli to the skin.

14. The method according to claim 12, wherein the code or the combination of the plurality of codes is selected based on a manual, visual or audio input or signals originating from biometric sensors.

15. The method according to claim 12, wherein the at least one actuator is controlled by manually manipulating an orientation and/or a position of the at least one actuator.

16. A non-transitory computer-readable storage medium encoded with computer program instructions which when executed by a computer cause a processor to execute a method to transmit information to a body, the method comprising:
providing a set of standardized codes, each code of the standardized codes being associated with a predefined activation pattern for at least one actuator designed to transmit the information to the body using skin as an interface;
selecting and transmitting a code or a combination of a plurality of codes to a wearable accessory having integrated therein the at least one actuator, the at least one actuator being outside a user's body;
controlling the at least one actuator according to the predefined activation pattern associated with the code or the combination of the plurality of codes transmitted;
extracting features about emotional states or states of mind from biometric and/or environmental signals of biometric and/or environmental sensors, and mapping results of the extracting to stored meta information; and
wirelessly transmitting the meta information to a receiver.

17. A piece of clothing or wearable accessory having a stimulation system and a computing device, said device being connected to a controlling device, the piece of clothing or wearable accessory comprising:
biometric and/or environmental sensors, the biometric and/or environmental sensors being integrated in the piece of clothing or wearable accessory;
at least one actuator, the at least one actuator being outside a user's body, the at least one actuator being configured to transmit information to the body using skin as an interface;
a processing device including a detecting device configured to detect emotional states and/or states of mind from biometric and/or environmental signals;
a mapping unit configured to map the detected emotional states and/or states of mind to a code of a set of standardized codes, each of said standardized codes being associated with a predefined activation pattern for at least one actuator; and
a transmitting device that transmits the code to the at least one actuator having the predefined activation pattern, wherein the stimulation system is configured to control the at least one actuator having the predefined activation pattern according to the predefined activation pattern associated with the code.

18. The piece of clothing or wearable accessory according to claim 17, wherein the detecting device comprises an extracting unit for extracting features from said biometric and/or environmental signals, and a mapping unit connected to a memory, the mapping unit being configured to map the extracted features to meta information stored in the memory.

19. A system for transmitting signals representing emotional states and/or states of mind, the system comprising:
a transmitter; and
a receiver,
the transmitter including:
biometric or environmental sensors, the biometric and/or environmental sensors being worn outside a user's body;
a processing device including a detecting device configured to detect the emotional states or the states of mind from biometric or environmental signals; and a transmitting device that wirelessly transmits meta information relating to the emotional states or states of mind to the receiver, the receiver including:

receiving means for wirelessly receiving meta information from another system for transmitting signals representing emotional states and/or states of mind;

actuating means for generating stimuli to skin, the actuating means being worn outside a user's body; and means for activating, controlling and deactivating said actuating means based on said meta information received, wherein the means for activating, controlling and deactivating said actuating means is connected with the means for wirelessly receiving and the actuating means.

20. The system of claim 19, wherein the transmitter and the receiver are implemented as a piece of clothing or wearable accessory, respectively.

* * * * *